US008751091B2

(12) United States Patent
Moench et al.

(10) Patent No.: US 8,751,091 B2
(45) Date of Patent: Jun. 10, 2014

(54) SENSOR SYSTEM, VEHICLE CONTROL SYSTEM AND DRIVER INFORMATION SYSTEM FOR VEHICLE SAFETY

(75) Inventors: Holger Moench, Vaals (NL); Mark Carpaij, Aachen (DE); Albert Comberg, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 850 days.

(21) Appl. No.: 12/919,257

(22) PCT Filed: Mar. 9, 2009

(86) PCT No.: PCT/IB2009/050961
§ 371 (c)(1),
(2), (4) Date: Aug. 25, 2010

(87) PCT Pub. No.: WO2009/113001
PCT Pub. Date: Sep. 17, 2009

(65) Prior Publication Data
US 2011/0035093 A1    Feb. 10, 2011

(30) Foreign Application Priority Data
Mar. 13, 2008  (EP) .................................... 08102559

(51) Int. Cl.
G06F 11/30    (2006.01)
(52) U.S. Cl.
USPC ................................. 701/29.1; 356/3; 356/27
(58) Field of Classification Search
USPC ........................................................ 701/29.1
See application file for complete search history.

(56) References Cited

U.S. PATENT DOCUMENTS 5,056,354 A    10/1991 Kuwana et al.
5,247,831 A     9/1993 Fioravanti
(Continued)

FOREIGN PATENT DOCUMENTS

| DE | 102005032334 A1 | 1/2007 |
|---|---|---|
| EP | 0517359 A2 | 12/1992 |
| EP | 1415876 A1 | 5/2004 |
| WO | 0237410 A1 | 5/2002 |
| WO | 2007149934 A2 | 12/2007 |

OTHER PUBLICATIONS

Raoul et al: "Double Laser Diode Speed Sensor for Contactless Measures of Moving Targets"; Fifth International Conference on Vibration Measurements by Laser Techniques: Advances and Applications; Proceedings of SPIE, Vol. 4827, 2002, pp. 363-373.

(Continued)

Primary Examiner — Ramsey Refai
(74) Attorney, Agent, or Firm — Yuliya Mathis (57) ABSTRACT

A sensor system is described, using self-mixing laser sensors (10) and an analyzer circuit (30) in order to determine the velocity of a vehicle, such as a car, and the rotational velocity of a wheel (20) of the car. Deviations between the velocity of the vehicle and the rotational velocity of the wheel (20) can be used to determine sliding of the wheel (20) and, finally, the traction or, more specifically, the coefficient of driving friction between the wheel (20) and the surface the car is driving on. Furthermore, a vehicle control system is described, initiating test accelerations of a wheel (20) by means of a control circuit (50) and control means (300, 400) in order to determine the coefficient of driving friction during driving. The test accelerations initiate short periods of sliding of the wheel (20) and the sliding is detected by means of the sensor system.

16 Claims, 10 Drawing Sheets

(56) References Cited

U.S. PATENT DOCUMENTS

| | | |
|---|---|---|
| 5,719,565 A | 2/1998 | Tsuno et al. |
| 6,389,350 B1 | 5/2002 | Fennel |
| 6,675,074 B2 | 1/2004 | Hathout et al. |
| 6,763,288 B2 | 7/2004 | Caretta et al. |
| 2005/0080542 A1 | 4/2005 | Lu et al. |
| 2005/0205346 A1 | 9/2005 | Aizawa et al. |
| 2008/0137062 A1* | 6/2008 | Holton et al. .......... 356/28 |

OTHER PUBLICATIONS

Giuliani et al: "Laser Diode Self-Mixing Technique for Sensing Applications"; Journal of Optics A: Pure and Applied Optics, Vol. 4, No. 6, 2002, pp. S283-S294.

Vogel et al: "A Low-Cost Medium-Resolution Rangefinder Based on the Self-Mixing Effect in a VCSEL"; IEEE Transactions on Instrumentation and Measurement, Vol. 54, No. 1, February 2005, pp. 428-431.

* cited by examiner

SENSOR SYSTEM, VEHICLE CONTROL SYSTEM AND DRIVER INFORMATION SYSTEM FOR VEHICLE SAFETY

FIELD OF THE INVENTION

The present invention relates to a sensor system, a vehicle control system comprising the sensor system and a driver information system coupled to the vehicle control system and/or the sensor system.

The invention further relates to a method of determining the traction between the wheel of the vehicle and a surface the vehicle is driving on.

BACKGROUND OF THE INVENTION

WO 2007/149934 A2 describes an optical method and apparatus for measuring properties of a travel vehicle or a travel surface upon which the vehicle travels, which method includes providing an incident light from a light source to the travel surface, collecting light reflected from the travel surface, determining a surface-induced Doppler shift from the incident and collected light and determining at least one of a motion property of the travel vehicle and a surface property of the travel surface based on the determined surface-induced Doppler shift. The apparatus is bulky and is impractical for many travel vehicles.

OBJECT AND SUMMARY OF THE INVENTION

It is an object of the present invention to provide an improved sensor system allowing measurement of at least one parameter related to the movement of a vehicle.

Further objects of the invention are to provide a control system comprising the sensor system, a driver information system coupled to the vehicle control system and/or the sensor system, and to provide an improved method of measuring at least one parameter related to the movement of a vehicle.

In accordance with a first aspect of the invention, a sensor system is provided, comprising at least one laser sensor working with self-mixing interference, at least one rotation sensor and an analyzer circuit, the at least one laser sensor being adapted to generate measurement data resulting from a first velocity component of a vehicle, the rotation sensor being adapted to generate measurement data resulting from a first rotational velocity of a first wheel of the vehicle, the analyzer circuit being adapted to receive the measurement data generated by the at least one laser sensor, said rotation sensor and analyzer circuit being further adapted to determine the first velocity component of the vehicle and the first rotational velocity of the first wheel of the vehicle. The rotation sensor may be coupled to a wheel hub in order to generate measurement data with respect to the angular velocity of the wheel, wherein the first rotational velocity of the first wheel or, more precisely, the velocity of the surface elements of the wheel coming into contact with the surface the vehicle is driving on may be determined by means of the analyzer circuit comprising a calculation unit and memory device wherein the radius of the wheel is stored. Alternatively, the rotation sensor may be a laser sensor which works with self-mixing interference and allows generation of measurement data directly related to the first rotational velocity of the first wheel. The laser sensor comprises a laser source and a detector. Depending on the electrical driving scheme of the laser source, either the distance and/or the velocity of the target can be detected. The detector may be a photodiode and the laser source may be a laser diode such as, for example, a side-emitting laser diode, a Vertical Cavity Surface Emitting Laser (VCSEL) or Vertical Extended Cavity Surface Emitting Laser (VECSEL). Details about detection of velocities by means of self-mixing interference can be found in, for example, WO 02/37410 A1 FIG. 2 to FIG. 7 and the related description. One laser sensor may be used to subsequently measure the first velocity component and the first rotational velocity by moving the laser sensor or by adding an optical device such as a moveable mirror. The vehicle may be, for example, a car, a motorbike, or a train.

In one embodiment of the invention, the laser sensor comprises a Vertical Cavity Surface Emitting Laser (VCSEL) diode or a Vertical Extended Cavity Surface Emitting Laser (VECSEL) diode and a photodiode coupled to the Vertical Cavity Surface Emitting Laser diode. VCSELs or VECSELs allow integration of the photodiode and the laser diode in one device by means of semiconductor processing. This allows a simple and cost-effective production of laser sensors. Furthermore, the laser sensor has a small size, which allows implementation of two, three, four or an array of VCSELs or VECSELs. VCSELs or VECSELs can be easily produced in arrays wherein each laser emits the laser radiation essentially in the same direction. Two or more laser sensors offer the opportunity to control the measurement results of each single laser sensor by means of at least one additional laser sensor. Controlling the measurement data of one laser sensor by means of the results of at least one additional laser sensor may improve the accuracy of the laser sensor in accordance with this embodiment as compared to the prior art described above. Furthermore, a control element may be implemented in the laser sensor in order to vary the focal point of the laser radiation and/or the intensity of the laser radiation and/or the direction of the laser radiation emitted by the Vertical Cavity Surface Emitting Laser diodes in different ways. The adaptation of the laser sources to emitting laser radiation in essentially the same direction means that the laser sources are aligned in parallel so as to emit laser radiation in the same direction. After the emission, the laser radiation emitted by the different laser sources may be manipulated e.g. by means of the control element causing a deviation from the direction of emission of the laser radiation, wherein the deviation from the direction of emission of the laser radiation may be different for different laser sources. Each laser source may have a dedicated detector which only detects the modulation of the laser radiation emitted by the relevant laser source. The laser sources and the detectors may be, for example, integrated SMI sensors manufactured by means of semiconductor processing. The laser radiation of at least two different laser sources may be varied in different ways by means of the control element regarding the focal point of the laser radiation and/or the intensity of the laser radiation and/or the direction of the laser radiation. This may be done, for example, by means of variable optical attenuators, variable focus lenses or moveable mirrors provided for at least two or all laser sources integrated in the sensor system. Alternatively, a passive optical element may be used in order to vary or manipulate the laser radiation emitted by the laser sources in different ways. This may be done, for example, by means of a curved mirror reflecting laser radiation emitted by one laser source depending on the point on the mirror where the emitted laser radiation impinges upon the mirror. Use of an array of laser sources and detectors may allow a variation of the slanting angle with respect to a reference axis without moving parts. Furthermore, lenses having different focal lengths may be used in order to vary the focal points of laser sources in an array of laser sources. Alternatively or in combination with lenses and/or mirrors, the passive optical element may be an optical attenuator. Use of, for example, a first optical attenuator having a first optical attenuation in combination with a first laser source and a first detector and a second optical attenuator having a second optical attenuation different from the first optical attenuation in combination with a second laser source and a second detector may simplify the sensor module. The different laser sources may be driven in parallel, or they may be driven sequentially by using an appropriate electric driving circuit. Driving the different laser sources sequentially (one after the other) may reduce the complexity of the electronic circuitry. Use of passive optical elements in combination with an array of laser sources and detectors (three, four, five or more laser sources and detectors) may yield a flexible, cost-effective and reliable sensor system.

In a further embodiment of the sensor system according to the invention, the sensor system is further adapted to generate measurement data resulting from a second velocity component of the vehicle different from the first velocity component, and the analyzer circuit is further adapted to determine the second velocity component of the vehicle. A second velocity component may be especially but not exclusively of interest if the movement of the vehicle is not limited to one dimension such as, for example, in the case of a motorbike or a car. Combining the measurement data provided by, for example, one laser sensor subsequently measuring a first velocity component and a second velocity component of a vehicle offers the opportunity to determine the direction of the velocity and the total velocity of the car, motorbike or the like by means of the analyzer circuit. In addition, the determination of a third velocity component which is different from the first and the second velocity component, for example, the velocity of the vehicle perpendicular to the surface the vehicle is driving on may be used to improve the accuracy of the sensor system. Use of two, three, four or more laser sensors may increase the accuracy of the sensor system as compared to the prior art. One laser sensor may be used in order to subsequently measure all velocity components and the first rotational velocity by using a control element such as a moveable mirror. Alternatively, two, three, an array or even a plurality of arrays may be used to measure one, two and/or three velocity components of the vehicle and the rotational velocity.

In another embodiment of the sensor system according to the invention, the at least one laser sensor is further adapted to generate measurement data resulting from a first distance between the mounting location of the laser sensor and a surface the vehicle is driving on and at least a second distance between the mounting location of the laser sensor and the surface the vehicle is driving on, or between the mounting location of the laser sensor and the surface of the first wheel of the vehicle, the first distance being different from the second distance and the analyzer circuit being adapted to determine the first distance and the second distance. A laser sensor working with self-mixing interference in combination with the analyzer circuit has the advantage that the distance to the wheel and the rotational velocity of the wheel can be determined by changing the driving scheme of the laser sensor as described in François Vogel and Bruno Toulouse, "A Low-Cost Medium-Resolution Rangefinder Based on the Self-Mixing Effect in a VCSEL", IEEE Transactions on Instrumentation and Measurement, Vol. 54, No. 1, February 2005, herein incorporated by reference, and by adapting the analyzer circuit accordingly. Determining subsequently or in parallel (by using, for example, two laser sensors) the rotational velocity of the wheel and the distance between the mounting location of the laser sensor and the wheel offers the opportunity to take into account the variation of the radius of the wheel due to wear-out of the wheel, insufficient air pressure of a wheel filled with air or the load of the vehicle. The accuracy of the measurement may be improved by measuring, with the laser sensor or an additional laser sensor, the distance to a reference point that may be placed on the axes of the wheel having a fixed distance to the surface of the wheel coming into contact with the surface the vehicle is driving on. The distance between the laser sensor and the surface of the wheel or the reference point that may be placed on the axes of the wheel may be used to determine the normal force exerted on the wheel by the surface the vehicle is driving on. The normal force is correlated with this distance via the load of a suspension of the wheel. Also scanning of the surface of the wheel may be used to improve the accuracy by determining the status such as, for example, wear-out or tire pressure of the wheel. Furthermore, the measurement of the first velocity component and/or the first rotational velocity may be influenced by variations of the angle of incidence of a laser beam emitted by the laser sensor due to loading of the vehicle and/or vibrations caused by the surface the vehicle is driving on. Measurement of the distance between the mounting location of the laser sensor and the wheel and/or between the mounting location of the laser sensor and the surface the vehicle is driving on may be used to correct the determination of the first velocity component and/or the first rotational velocity with respect to this variation of the angle of incidence. Naturally, the distance measurement by means of the laser sensor can also be combined with a rotation sensor coupled to the wheel hub in order to calculate the velocity of the surface of the wheel based on the angular velocity measured by the rotation sensor and the radius of the wheel determined by means of the laser sensor.

In yet another embodiment according to the invention, the analyzer circuit is further adapted to determine the traction between at least the first wheel and the surface the vehicle is driving on by analyzing the first rotational velocity in relation to the first velocity component and/or the second velocity component of the vehicle and/or the third velocity component of the vehicle. The reliable determination of the first velocity component and the first rotational velocity or, more precisely, the velocity of surface elements of the first wheel coming into contact with the surface the vehicle is driving on may allow a reliable determination of the traction between the first wheel and the surface the vehicle is driving on. If the vehicle is, for example, a train, the measurement beam may be directed on the rail, and the absolute value of the first velocity component and the first rotational velocity are equal as long as there is no slide between the first wheel and the rail. The coefficient of driving friction determines the maximum force or, more precisely, the maximum torque that can be transferred by the first wheel to the rail, and vice versa. The maximum force that can be transferred by the first wheel to the rail may be determined by the sensor system at those moments when the first wheel starts to slide. The coefficient of driving friction may be calculated if the normal force exerted on the wheel by the surface the vehicle is driving on is determined or known. The same principle may be used in cars or motorbikes. In these cases, it may be an advantage to determine the relative position of the body of the vehicle with respect to the surface the vehicle is driving on. The relative position of the vehicle body is influenced by the load of the vehicle and/or any kind of acceleration. Depending on the position of the vehicle body, the measurement of the velocity component or components of the vehicle by means of the laser sensor may be influenced by different angles of incidence with respect to the surface the vehicle is driving on. The position of the vehicle body along a line may be determined by way of at least two measurements by means of a laser sensor determining the distance between the surface the vehicle is driving on and the vehicle body in two different directions. Determining the plane of the vehicle body requires at least a third measurement of the distance between the surface the vehicle is driving on and the vehicle body in a third independent direction by means of the laser sensor or an additional laser sensor. In an alternative or supplemental approach to the distance measurements, a second and/or third velocity component of the vehicle different from the first velocity component may be determined by means of the laser sensor or sensors. The second and/or third velocity component may be used to improve the accuracy of the first velocity component comparing variations of the first, second and/or third velocity component which may be caused by declination and/or vibrations of the vehicle body. The total velocity of the vehicle may be determined with great accuracy. The results of this comparison of the variations of the first, second and/or third velocity component may be used to improve the accuracy of determining the first rotational velocity. In addition, the accuracy of the measurement data and the determined first rotational velocity may be directly improved in order to allow a reliable determination of the traction and/or the coefficient of driving friction. The sensor system may determine the distance between the vehicle body and the wheel, and/or the first rotational velocity may be measured at different positions of the wheel, either subsequently by means of one laser sensor or in parallel by means of two, three, four or more laser sensors in order to improve the accuracy of the sensor system with respect to movements of the vehicle body in relation to the wheel, which movements may be caused by e.g. oscillations or steering of the vehicle. Alternatively or in addition, a rotation sensor coupled to a wheel hub may be calibrated with respect to the first velocity component at time periods of substantially constant velocity. A laser sensor may be used to determine the first velocity component, taking into account, for example, the status of the wheel caused by wear-out, load or air pressure as described above.

In a further embodiment according to the invention, the sensor system is adapted to generate measurement data resulting from at least a second rotational velocity of a second wheel, and the analyzer circuit is further adapted to determine the traction between the second wheel and the surface the vehicle is driving on by analyzing the second rotational velocity in relation to the first velocity component, the analyzer circuit being adapted to determine the difference between the first rotational velocity and the second rotational velocity. Measuring and determining the rotational velocity of one, two, three, four or all wheels of a vehicle in combination with the measurement and determination of at least one velocity component of the vehicle may allow a reliable determination of interaction between the vehicle or, more precisely, the wheels of the vehicle and the surface the vehicle is driving on. Further differences between the part of the surface the first wheel interacts with and the part of the surface the second wheel interacts with may be detected by determining the first and the second rotational velocity and the corresponding traction.

In another embodiment according to the invention, the analyzer circuit is adapted to determine at least one first acceleration component by determining the time-dependent differences of at least one velocity component of the vehicle and/or at least one first rotational velocity of the wheels. The acceleration of more than one wheel may be determined independently. The acceleration data may be used to improve the stability of the vehicle during driving. Alternatively, the velocity data supplied by a sensor system according to the invention may be combined with acceleration data measured by acceleration sensors of an Electronic Stability Program (ESP) system. The acceleration sensors of the ESP system determine the acceleration of the whole vehicle, wherein the sensor system in accordance with this embodiment of the invention may determine, for example, the acceleration of one wheel of the vehicle. Furthermore, an independent determination of acceleration data by means of the sensors of an ESP system and a sensor system and a combination and/or comparison of both data sets may be used to enhance the stability and security of a vehicle.

In accordance with a further aspect of the invention, a sensor system according to the invention may be integrated in a vehicle control system. In addition to the sensor system, the vehicle control system may comprise a control circuit which is adapted to receive data from the analyzer circuit and is further adapted to activate control means, taking the data received from the analyzer circuit into account. The data received by means of the control circuit may be velocity data, distance data, traction data and/or acceleration data determined by the analyzer circuit. In addition, the vehicle control system may receive other data supplied by other systems in the vehicle, such as the ESP system in cars. The control means may be a steering system of a train, a steering wheel of a car, the braking system or motor control. The analyzer circuit may be part of the control circuit. The vehicle control systems may be coupled to a vehicle security system such as the Anti-lock Braking System (ABS). The traction data may be used to improve the effectiveness of the ABS by supplying more precise information about the braking force causing locking of the wheel or wheels. As a consequence, the braking distance may be reduced. In another approach, the control means may comprise a steering wheel of the vehicle. The control circuit may detect skidding of the vehicle and activate mechanical and/or acoustical signals. The mechanical and/or acoustical signals may guide a driver of the vehicle in order to keep control of the vehicle. The mechanical and/or acoustical signals may comprise vibrations of the steering wheel or sounds indicating an overdrive of the vehicle. In an active approach, the mechanical signal may be given by the resistance of the steering wheel guiding the steering in the opposite direction in order to prevent overdriving.

In another embodiment according to the invention, the control circuit of the vehicle control system is adapted to activate the control means so as to initiate test accelerations of at least one first wheel of the vehicle independently of the data received from the analyzer circuit, the control circuit being further adapted to determine the maximum frictional force between at least the first wheel and the surface the vehicle is driving on by analyzing the data received from the analyzer circuit. Test accelerations may be a short braking moment or a sequence of subsequent braking moments of preferably different strengths or positive acceleration or accelerations of the vehicle by supplying more power to the wheel or wheels. In this case, the maximum frictional force may be characterized by a defined pressure in the braking system. The absolute strength of a braking or the absolute braking force may be determined independently by means of the sensor system. After the wheel loses traction with the surface the vehicle is driving on, the wheel slows down quickly (determined by the absolute braking force and the torque of inertia of the wheel). The acceleration of the wheel is determined by means of the sensor system. In combination with the known torque of inertia of the wheel, this may give an indication of the absolute braking force supplied to the wheel. Furthermore, a combination of braking and acceleration of different wheels (e.g. supplying more power to the front wheels of a car and short braking moments of the rear wheels of a car) may be used in order to determine the maximum frictional force between the first or further wheels and the surface the vehicle is driving on. The control circuit of the vehicle control system may be further adapted to determine the normal force between the first wheel and the surface the vehicle is driving on and it may be adapted to determine the coefficient of driving friction between the first wheel and the surface the vehicle is driving on. The coefficient of driving friction can be determined by means of the ratio between the maximum frictional force and the normal force. The normal force is the force that the surface the vehicle is driving on exerts on the first wheel. The normal force may be determined e.g. by measuring the distance between the first wheel or a reference point on the axis of the first wheel and the vehicle body and by determining the related compression of the suspension of the first wheel. The compression of the suspension of the wheel is correlated with a certain elastic force that may be used to calculate the normal force. Alternatively, the normal force may be determined by means of sensors (e.g. a pressure sensor implemented in the suspension) measuring the compression of the suspension.

The dynamic and direct detection of the maximum frictional force or the coefficient of driving friction may be used to improve the braking efficiency (e.g. ABS) of the vehicle or the steering security of a vehicle as described above. The vehicle control system preferably works without the vehicle driver's notice.

A sensor system according to the invention or a vehicle control system comprising such a sensor system may be coupled to a driver information system. The driver information system is adapted to receive data from the sensor system and/or the vehicle control system and is further adapted to supply optical and/or acoustical information based on the data received from the sensor system to a driver of the vehicle.

The driver information system may supply warnings to the driver of the vehicle due to risky driving. Alternatively or in addition, the driver information system may inform the driver about contingency reserves.

In accordance with a further aspect of the invention, a method of determining the traction between a wheel of a vehicle and a surface the vehicle is driving on is provided, the method comprising the steps of:
measuring a first velocity component of a vehicle by means of self-mixing interference,
measuring at least a first rotational velocity of a first wheel of the vehicle by means of a rotation sensor,
measuring a first distance between the vehicle and the surface the vehicle is driving on,
measuring at least a second distance between the vehicle and the surface the vehicle is driving on or between the vehicle and the first wheel, and
determining the traction between at least the first wheel and the surface the vehicle is driving on by analyzing the first rotational velocity in relation to the first velocity component by means of an analyzer circuit, taking the first distance and the second distance into account. The plane of the vehicle may be determined by adding a step of determining a third distance between the vehicle and the surface the vehicle is driving on.
Alternatively or in addition to the steps of measuring the first distance and the second distance, the method may comprise the step of:
measuring a second and a third velocity component of the vehicle by means of self-mixing interference.
Furthermore, the first rotational velocity may be measured at different positions of the first wheel.

The method may also comprise the steps of:
inducing test accelerations of the vehicle as described above, and/or
determining the coefficient of driving friction. The method may be used to improve the stability of a vehicle.

Additional features will be described below, which can be joined or combined with any one of the aspects. Other advantages, particularly over other prior art, will be apparent to those skilled in the art. Numerous variations and modifications can be made without departing from the claims of the present invention. It should therefore be clearly understood that the form of the present invention is illustrative only and is not intended to limit the scope of the invention.

BRIEF DESCRIPTION OF THE DRAWINGS

The present invention will be explained in greater detail with reference to the Figures, in which the same reference signs indicate similar parts, and in which:
FIGS. 8 to 10 are schematic drawings showing the influence of the relative position of the vehicle with respect to the surface the vehicle is driving on.

DESCRIPTION OF EMBODIMENTS

Figure 1:
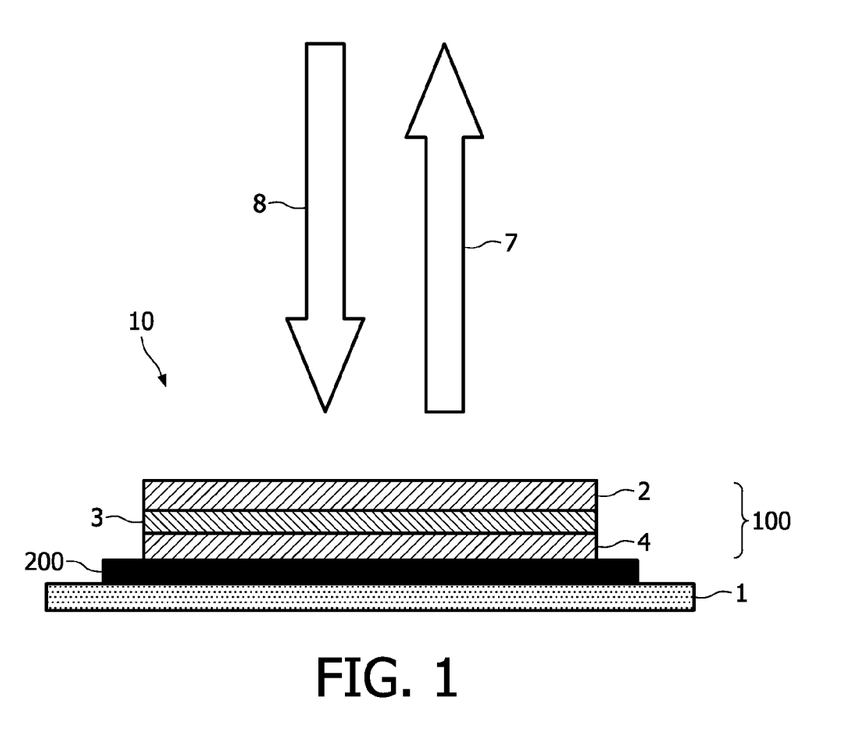
FIG. 1 is a schematic view of a laser sensor comprising a VCSEL and an integrated photodiode.

FIG. 1 shows a VCSEL which may be used as a laser source 100, together with an integrated photodiode which may be used as a detector 200 in a laser sensor 10 according to the present invention. The VCSEL comprises a layer structure and is formed by an electrically pumped gain medium 3 (InGaAs quantum wells embedded in GaAs) embedded between two Distributed Bragg Reflectors (DBR) 2, 4, which form an inner cavity of the laser. One of the DBRs is p-doped and the other is n-doped so as to allow efficient current feeding into the gain region. In this example, the lower DBR 4 is n-doped and the upper DBR 2 is p-doped. Principally, however, doping in the reversed order is also possible. The operating current for current injection into the gain medium 3 is provided by an appropriate power source (not shown) connected to a control unit (not shown) for timely modulating the injection current. A frequency shift of the emitted laser radiation 7 for obtaining the desired distance or velocity information is achieved with this current modulation. A suitable current shape is fed into the gain region via the n and p-DBR electric contacts (not shown in the Figure). The detector 200, a photodiode attached to the rear side of the lower DBR 4, measures the small quantity of radiation leaking from the mirror 4 and thus monitors the influence of the backscattered light 8 from the target (not shown in the Figures) on the laser, from which information the distance or velocity of the target object can be extracted. The photodiode is grown on an appropriate substrate 1. The further layers of the VCSEL structure are subsequently grown on top of the photodiode. Such a layer structure on this substrate can be produced in a low-cost production process for VCSEL chips. In an alternative approach, the VCSEL structure starting with the upper DBR 2 may be grown on top of an optically transparent substrate (depending on the wavelength of the emitted laser radiation 7). The photodiode is grown on the lower DBR 4 and would therefore be attached to the rear side of such a chip. The laser radiation is emitted through the substrate in this case.

As an alternative to a VCSEL, a VECSEL (Vertically Extended Cavity Surface Emitting Laser) may be used. In this case, an external laser mirror (not shown) placed and adjusted at a suitable distance above the upper DBR 2 forms the external cavity. The reflectivity of the upper DBR 2 is reduced in comparison with the VCSEL in order to allow feedback from the external cavity. A narrow-band Volume Bragg Grating (VBG) having appropriate IR reflection properties can form the external laser mirror, for example, by means of a metal or dielectric coated mirror. In contrast to the VCSEL, the gain medium is electrically pumped at a level which does not allow the inner laser cavity system (gain medium 3 sandwiched between DBRs 2 and 4) to exceed the laser threshold, but requires feedback of the external cavity, i.e. the external mirror, so as to achieve lasing. In this way, the properties of the emitted laser radiation 7 are determined by the external laser cavity rather than by the short inner cavity on the VCSEL chip. Consequently, also the divergence angle of the emitted laser radiation 7 may be decreased and the mode quality may be enhanced as compared with a pure VCSEL-based sensor. The laser may be better focused on a target object such as a road or a wheel, and the feedback 8 (backscattered radiation from the target object) into the laser cavity, which is required for the sensing application, may be improved.

Figure 2:
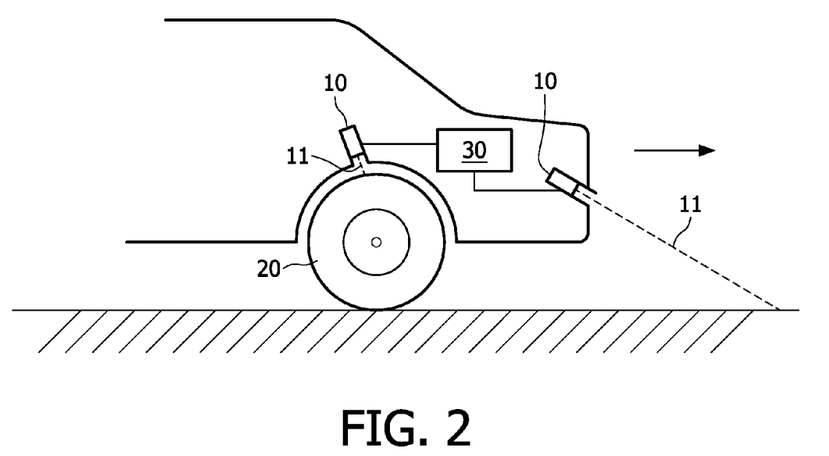
FIG. 2 shows a first embodiment of a sensor system according to the invention.

FIG. 2 shows a first embodiment of the sensor system according to the invention. Two laser sensors 10 are integrated in the body of a vehicle. Each laser sensor 10 may comprise a driving circuit (not shown) connected to a power source (not shown). A first laser sensor 10 is arranged in such a way that the laser radiation 11 emitted by the first laser sensor impinges upon a wheel of the vehicle, and a second laser sensor 10 is arranged in such a way that the laser radiation 11 emitted by the second laser sensor impinges upon the surface the vehicle is driving on. Furthermore, an analyzer circuit 30 is shown, which receives measurement data (via a wired or wireless connection) supplied by the first and the second laser sensor. The analyzer circuit determines a first rotational velocity of the wheel (velocity of the surface of the wheel being hit by the laser radiation emitted by the first laser sensor) and a first velocity component of the vehicle. The first rotational velocity and the first velocity component may be transmitted to a vehicle control system (not shown) or a driver information system (not shown). Alternatively, the first rotational velocity and the first velocity component are further processed in the analyzer circuit 30, and the processed data may be transmitted to the vehicle control system or the driver information system. Furthermore, the analyzer circuit may be adapted to trigger the driving circuits of the laser sensors in such a way that also the distance between the mounting location of the first laser sensor and the surface of the wheel and/or the distance between the mounting location of the second laser sensor and the surface the vehicle is driving on can be detected.

Figure 3:
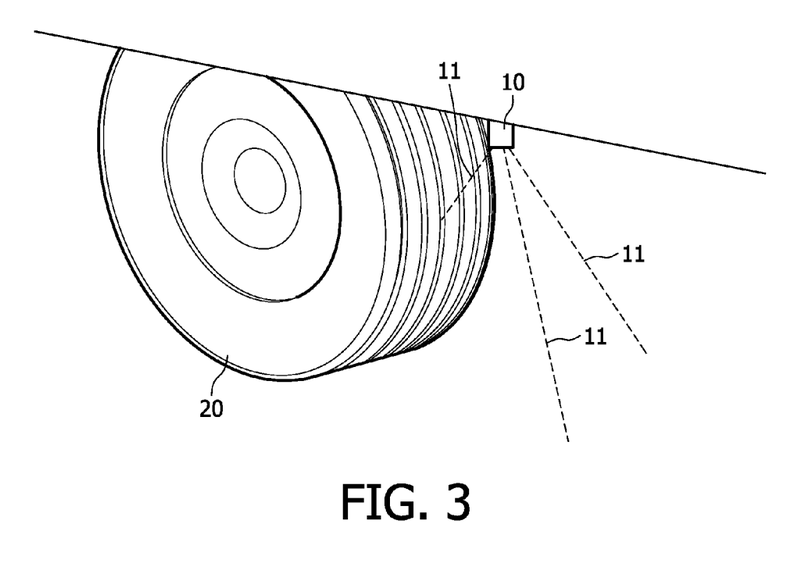
FIG. 3 shows a second embodiment of a sensor system according to the invention.

FIG. 3 shows a second embodiment of a sensor system according to the current invention, comprising a laser sensor 10 emitting laser radiation 11 in three different directions. A first laser beam impinges upon the first wheel 20, a second and a third laser beam impinge upon the surface the vehicle is driving on at different places and different angles of incidence. In comparison with the first embodiment shown in FIG. 2, the third laser beam may be used to increase the accuracy of the sensor system by supplying an additional measurement to the analyzer circuit (not shown). Optionally, a second velocity component of the vehicle may be measured in order to determine the total velocity vector of the vehicle so as to increase the accuracy of the sensor system as described below. Optionally, a further fourth laser beam impinging upon the surface the vehicle is driving on may be added so as to determine the velocity of the vehicle perpendicular to the surface the vehicle is driving on. Alternatively or in addition, the three (or four) laser beams may be used to determine the plane of the vehicle body in relation to the surface the vehicle is driving on by measuring the distances to the first wheel and the surface the vehicle is driving on. As described above, the analyzer circuit may trigger the driving circuit or circuits of the laser sensor in order to measure velocity components and distances so as to improve the accuracy of the sensor system. The laser sensor may comprise one laser source, and the laser radiation 11 of the one laser source may be, for example, subsequently redirected by means of a moveable mirror. In another approach, the laser sensor comprises three laser sensors, each emitting laser radiation 11 in different directions or with additional optical means in order to redirect the laser radiation. Using three (or more) laser sources with detectors may offer the opportunity to measure different velocities, rotational velocities and/or distances in parallel so as to improve the accuracy of the sensor system.

Figure 4:
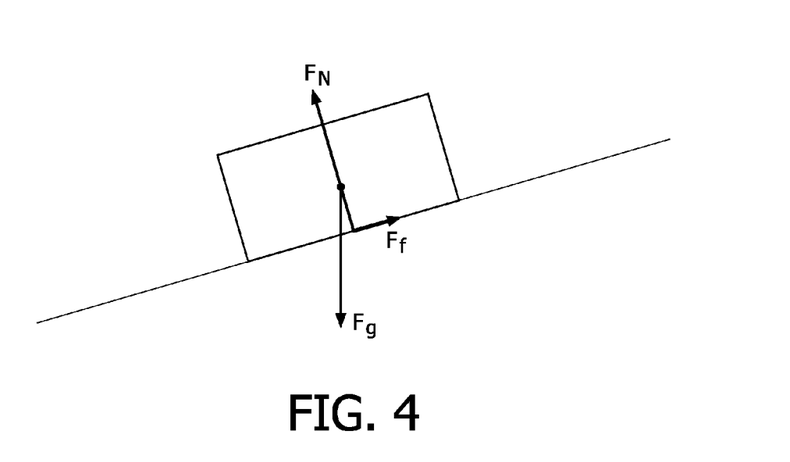
FIG. 4 shows the forces that are present at a block on a slope.

There is static friction between two surfaces if the two surfaces of the wheel 20 of a vehicle and the surface the vehicle is driving on are in contact with each other but do not move relative to each other, and a net force is exerted on them. For example, it is the static frictional force $F_f$ that prevents an object from sliding down a slope, counterbalancing the gravitational force as shown in FIG. 4. The frictional force is directed parallel to the contact surface and has such a magnitude that all forces are kept in equilibrium. Let it be assumed that the slope is increased. The frictional force will then increase too, until the moment when the static frictional force has reached its maximum. From then on, the frictional force will suddenly drop and the object will slide down the slope.

Figure 5:
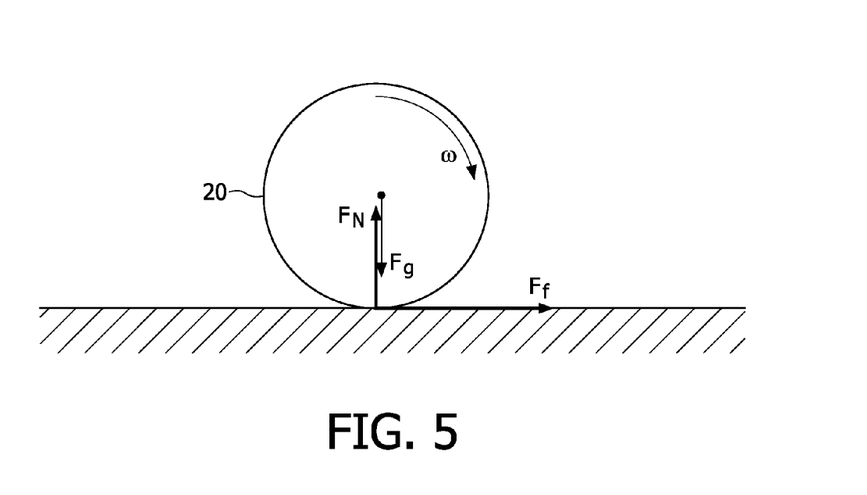
FIG. 5 shows schematically the forces that are relevant for static friction of a rolling wheel.

If a wheel rotating across a road is considered, in the case the wheel does not slide, the surface of the wheel in contact with the road does not move with respect to the road surface. Hence, a static frictional force will be exerted by the road on the wheel as shown in FIG. 5. The maximum static frictional force is proportional to the normal force exerted by the road on the wheel, and is $$F_f = \mu F_N$$

wherein $\mu$ is the coefficient of static frictional force, which may also be called the coefficient of driving friction. It depends on the road and wheel surfaces and on environmental influences such as temperature or humidity.

Figure 6:
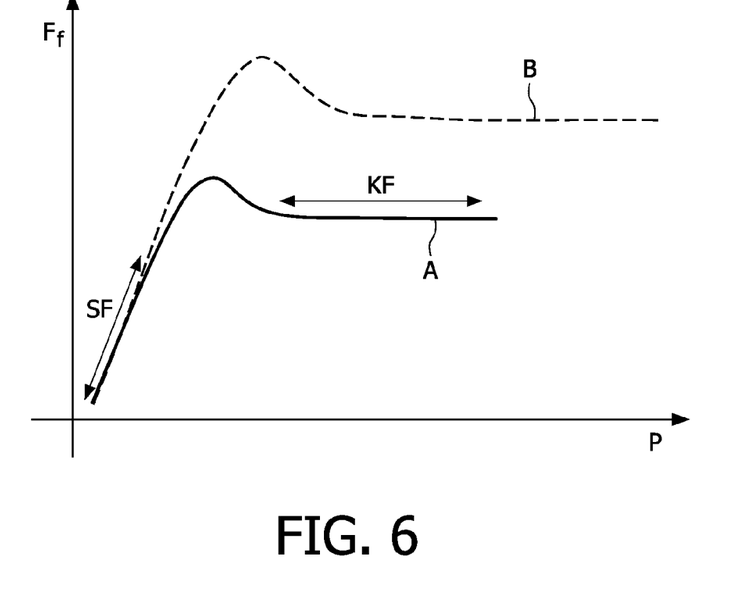
FIG. 6 shows the transition between static friction and kinetic friction.

FIG. 6 shows the frictional force $F_f$ of two wheels consisting of different materials A and B in dependence upon the power P supplied to the wheel. The static frictional force SF has a physical maximum limiting the maximum torque that can be supplied by the wheels to the road, or vice versa. Once this maximum is exceeded, the net force cannot be kept in equilibrium anymore and, as a result, the two contact surfaces will move with respect to each other. If the wheel rotates across the road, this implies that the wheel slides. However, once the two contact surfaces move with respect to each other, there is still a frictional force $F_f$ between the two surfaces, the kinetic frictional force KF, but it is smaller than the maximum static frictional force SF. It is very complicated to predict the maximum frictional force during normal operation of a vehicle. If the wheel operates in the static frictional force SF regime, the rotational velocity of the surface of the wheel being in contact with the surface the vehicle is driving on and the velocity of the vehicle will be identical, because the two surfaces do not move with respect to each other. It cannot be foreseen though if the static frictional force SF is close to its maximum (as it is in the case of material A shown in FIG. 6) or not (e.g. material B). A sensor system according to the invention may be used to estimate the limit of static friction by comparing the rotational velocity of one or more wheels of the vehicle with one or more velocity components of the vehicle. The vehicle may slide momentarily due to the driver's style of driving, the condition of the surface the vehicle is driving on and/or the status of the wheels. This short sliding interval and the resulting deviations between the rotational velocity or velocities and the one or more velocity components of the vehicle may be used to determine the maximum frictional force between the wheel and the surface the vehicle is driving on. If, furthermore, the normal force between the wheel and the surface the vehicle is driving on is determined at the same time, the coefficient of driving friction can be easily calculated as described above. The normal force may be determined e.g. by measuring the distance between the wheel and the vehicle body and the related compression of the suspension of the wheel. The compression of the suspension of the wheel is correlated with a certain elastic force. Furthermore, the compression of a suspension may be measured independently of the sensor system.

Figure 7:
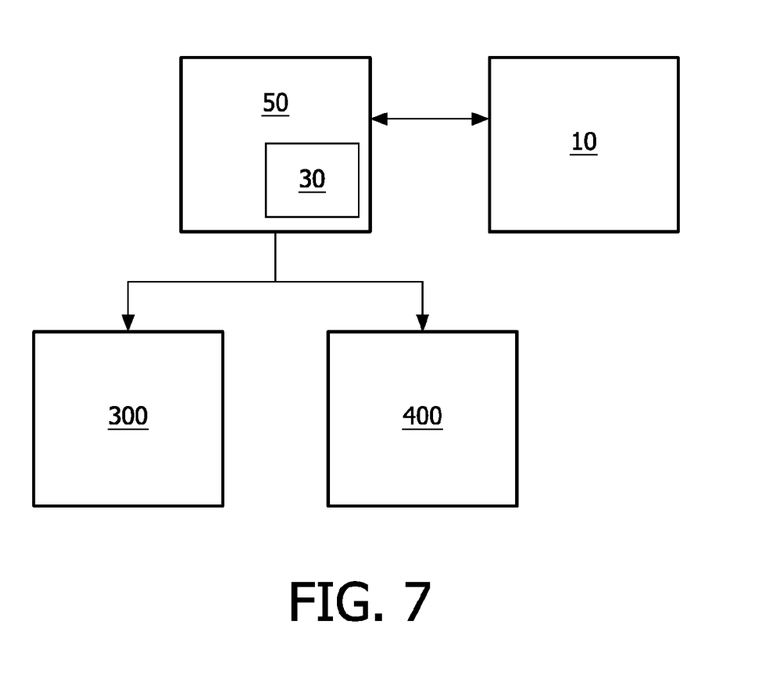
FIG. 7 is a schematic drawing of a vehicle control system.

In a more advanced approach as shown in FIG. 7, a vehicle control system which may be implemented in a vehicle such as a car (not shown) comprises a control circuit 50 receiving data from a sensor system according to the invention. The sensor system may comprise a laser sensor 10 as shown in, for example, FIG. 3, and an analyzer circuit 30 implemented in the control circuit 50. The control circuit 50 is adapted to activate control means such as the braking system 300 or motor control 400. The sensor system is able to measure the (instantaneous) difference between the rotational velocity of the wheel or wheels and the velocity of the vehicle. The vehicle control system carries out dynamic tests in non-critical driving situations, such as during acceleration from standstill or while braking. In these driving situations, the vehicle control system can actively control the braking and/or accelerating power of individual wheels by way of the control means, such that the vehicle still has the overall dynamics as intended by the driver, but single wheels are controlled differently by the vehicle control system. This is done for the purpose of determining the maximum value of the static frictional force (and, depending on the knowledge about the normal force, the coefficient of driving friction). The change from static frictional force to dynamic frictional force goes hand in hand with a drop-down in frictional force as shown in FIG. 6, with the consequence that the controlled wheel will slide. By monitoring both the rotational velocity of the wheel and the velocity of the vehicle by means of the laser sensor 10 and the analyzer circuit 30, this breakdown can be detected instantaneously, after which the test can be stopped. Several options are possible in order to initiate short sliding. These options comprise:

braking one wheel,
braking two wheels of the rear or front axle,
accelerating one wheel,
accelerating two wheels of the rear or front axle,
braking one wheel and accelerating another wheel, or
braking two wheels of one axle and accelerating two wheels of another axle.

The procedure of determining the coefficient of driving friction may be repeated after a determined period of time, or triggered changes in the structure of the surface the vehicle is driving on are indicated, for example, by oscillations of the vehicle or by other parameters that are important for driving security.

Figure 9:
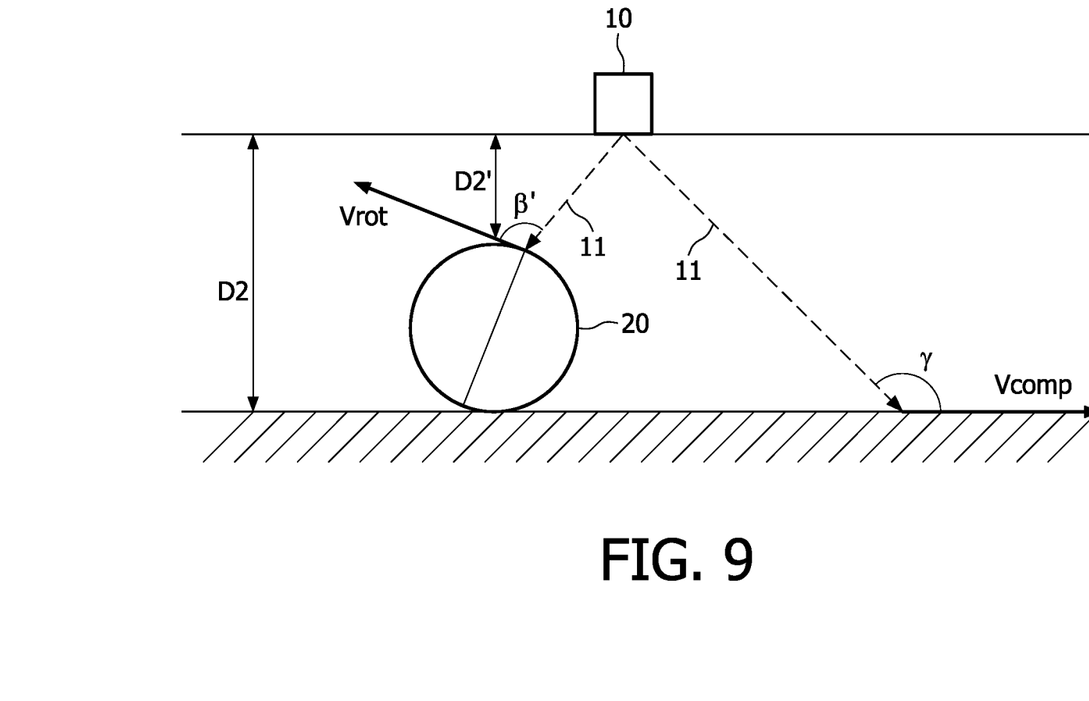
Figure 10:
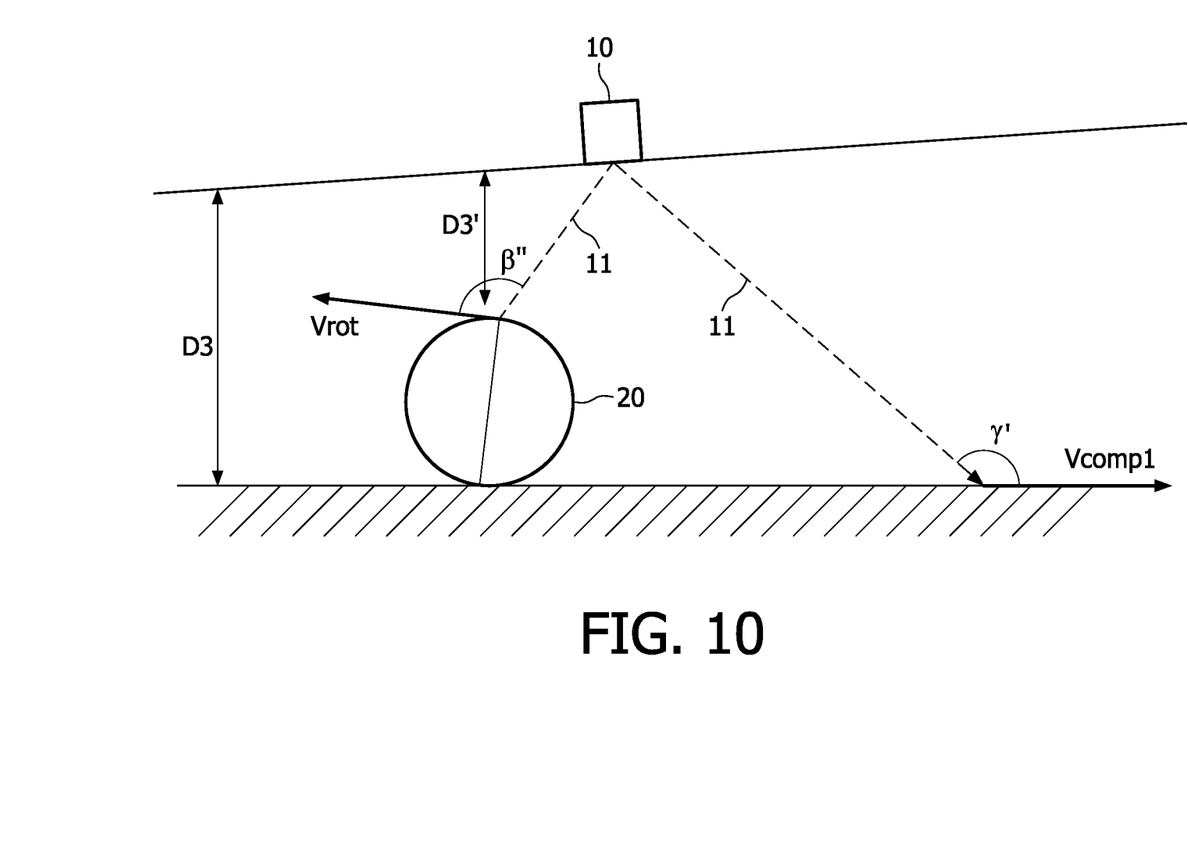

In order to determine a small difference between the rotational velocity of a wheel 20 and a velocity of a vehicle, both velocities need to be measured with a high accuracy. One problem associated with Doppler interferometry velocity measurements by means of a laser sensor 10 according to the invention is that the angle of incidence between the laser beam and the target object (wheel or axis, surface the vehicle is driving on) must be known accurately because only the velocity component collinear with a laser beam emitted by the laser sensor 10 is measured. Unfortunately, this angle is not constant during normal operation of a vehicle such as a car as represented in FIGS. 8 to 10.

Figure 8:
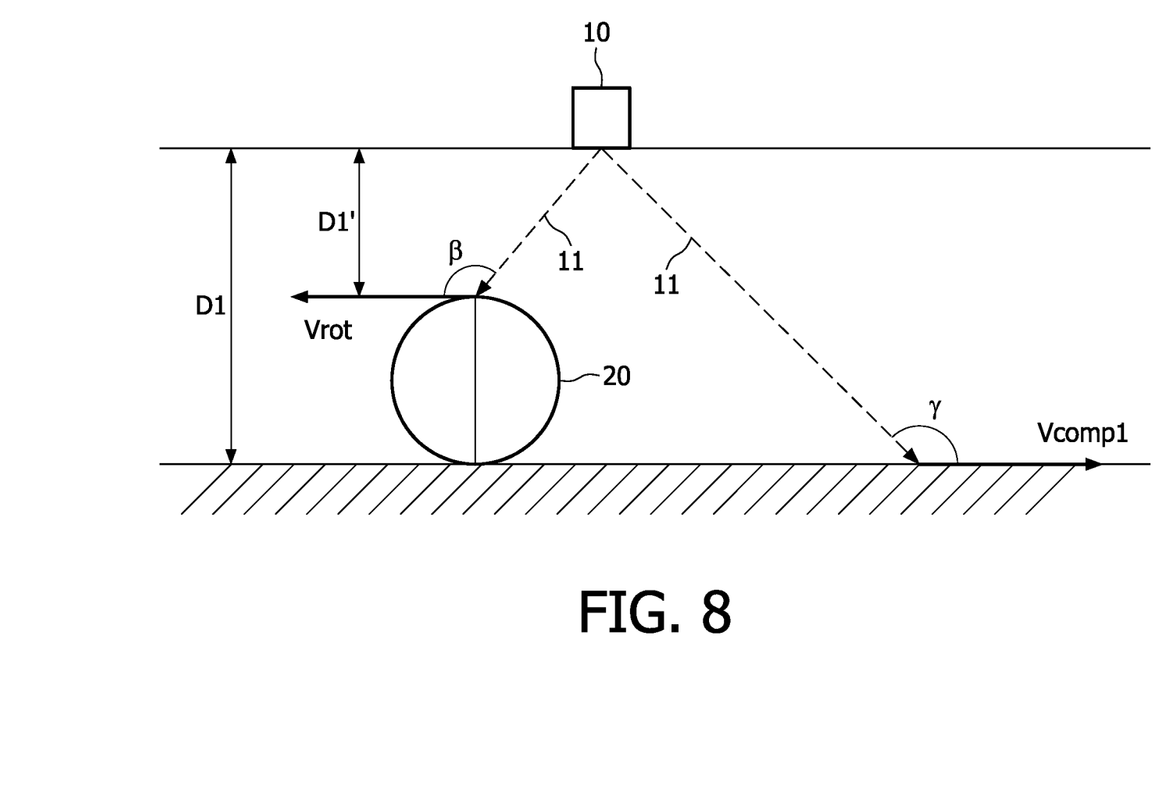

FIG. 8 shows a sketch of a sensor system according to the invention comprising a laser sensor 10 and an analyzer circuit (not shown). The laser sensor 10 is mounted to the body of the car. The body of the car is indicated by a solid line. A wheel 20 coupled to the body of the car is rolling on a surface the car is driving on at a velocity Vcomp1 which is equal to the rotational velocity of the wheel 20 Vrot (no sliding). The laser sensor 10 emits laser radiation 11 comprising a first laser beam impinging upon the wheel and a second laser beam impinging upon the surface the car is driving on. The first laser beam inclines an angle β with the tangent to the wheel at the point where the laser beam impinges upon the wheel, consequently yielding the velocity vector Vrot. The second laser beam inclines an angle γ with the surface the car is driving on, consequently yielding the velocity vector Vcomp1. The velocities $V_{wheel}$ and $V_{street}$ measured by means of Doppler interferometry are therefore given by:

$$V_{wheel}=V_{rot}*abs(cos(\beta)) \text{ and } V_{street}=V_{comp1}*abs(cos(\gamma))$$

Vrot and Vcomp1 can be determined accordingly. The distance between the body of the car and the surface the car is driving on is given by D1, and the distance between the body of the car and the wheel is D1'. FIG. 9 shows the same situation after evenly loading the car. The distance between the body of the car and the surface the car is driving on is reduced to D2, and the distance between the body of the car and the wheel is reduced to D2'. Both the difference between D1 and D1' and that between D2 and D2' remain constant. The body of the car is shifted parallel to the surface the car is driving on. The angle γ remains constant if the surface the car is driving on is essentially flat, with the angle β changing to β' because the wheel has a curved surface. Consequently, the measurement of the rotational velocity is influenced by the even loading of the car. FIG. 10 shows another situation. The car is either loaded unevenly or it is accelerated (positive or negative). The body of the car is slightly tilted with respect to the surface the car is driving on. As a consequence, both angles β and γ as shown in FIG. 8 are changed to β" and γ' in FIG. 10. Consequently, the measurement of the rotational velocity of the wheel and the velocity component of the car is probably influenced in a different way. Furthermore, the situation depicted in FIGS. 8 and 9 may show snapshots of vibrations of the suspension of the car, and the orientation of the sensor system, mounted to the body of the car, changes constantly.

Figure 11:
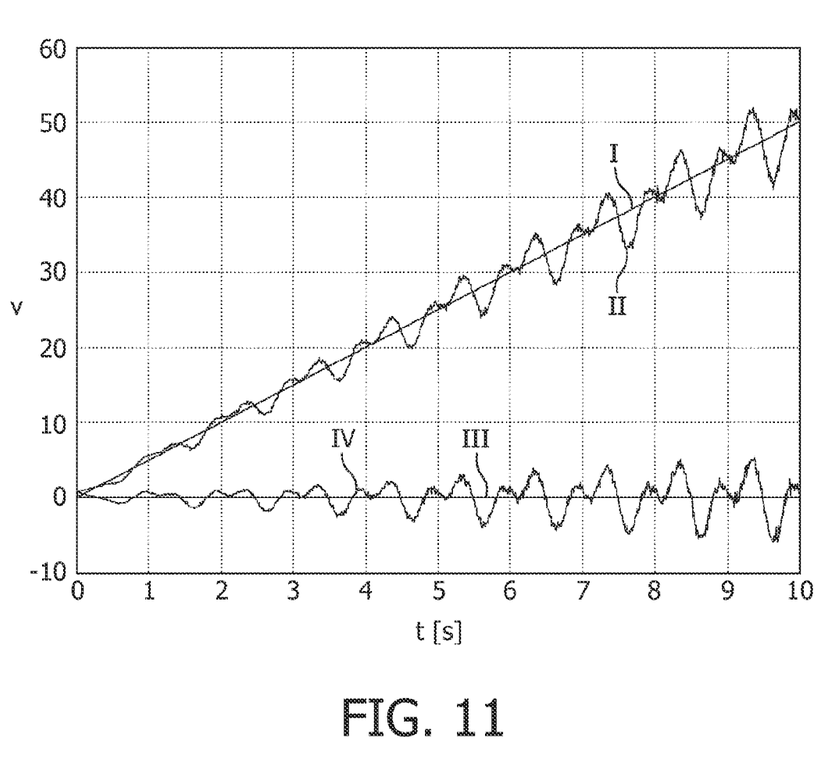
FIG. 11 shows the forward and lateral velocity of a car measured by two laser sensors.
Figure 12:
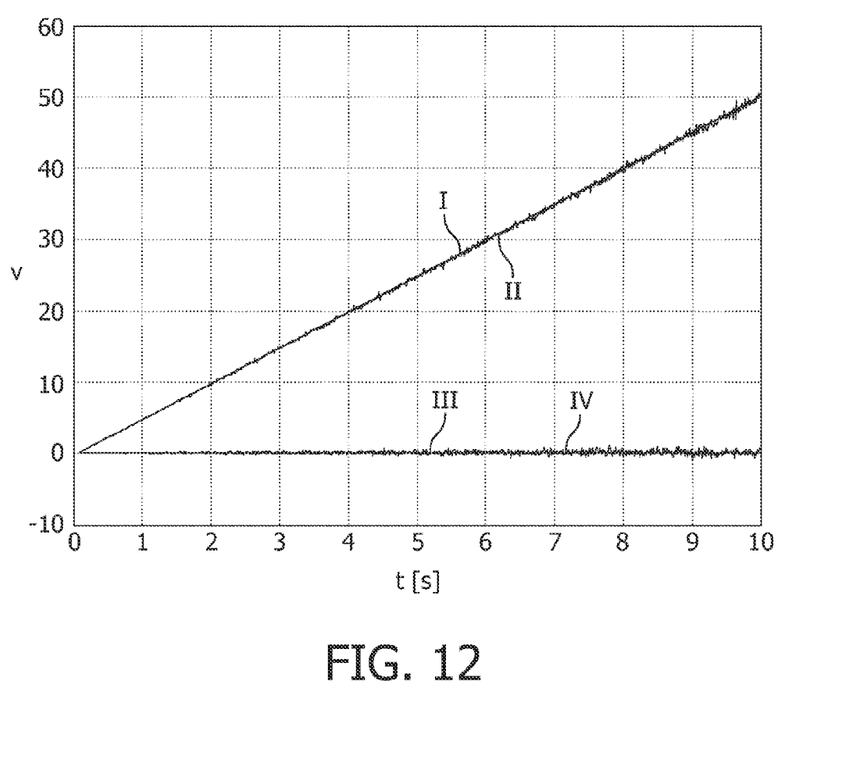
FIG. 12 shows the forward and lateral velocity of the car measured by three laser sensors.

FIGS. 11 and 12 show simulations of SMI measurements during vibrations of the car chassis. Due to these vibrations, the angles at which the laser beam impinges upon the road change in an uncontrolled way. If this effect is not accounted for, the vibration cannot be cancelled out. As is shown in FIG. 11, the forward velocity II (which is the large component of the velocity in the direction in which the car is heading) determined by means of the measured first velocity component as described above changes periodically around the 'real' forward velocity I of the vehicle body due to the periodic change of the angle of incidence of the laser beam. The 'real' forward velocity I is needed for a direct comparison with the rotational velocity of the wheel. FIG. 12 shows simulation results using at least three laser sensors, with fixed angles between them. The constant and known angular relationship between them can be used to cancel out these vibration motions causing the inaccuracy shown in FIG. 11. As can be seen from FIG. 12, the forward velocity II is not subject to the uncontrolled vibrations, as it does not show the periodical behavior anymore. Also the lateral velocity IV, a second velocity component of the vehicle, being the sideward velocity of the vehicle in e.g. a curve or when sliding, which is additionally measured by the laser sensor system, is the desired 'real' lateral velocity III of the vehicle body.

Figure 13:
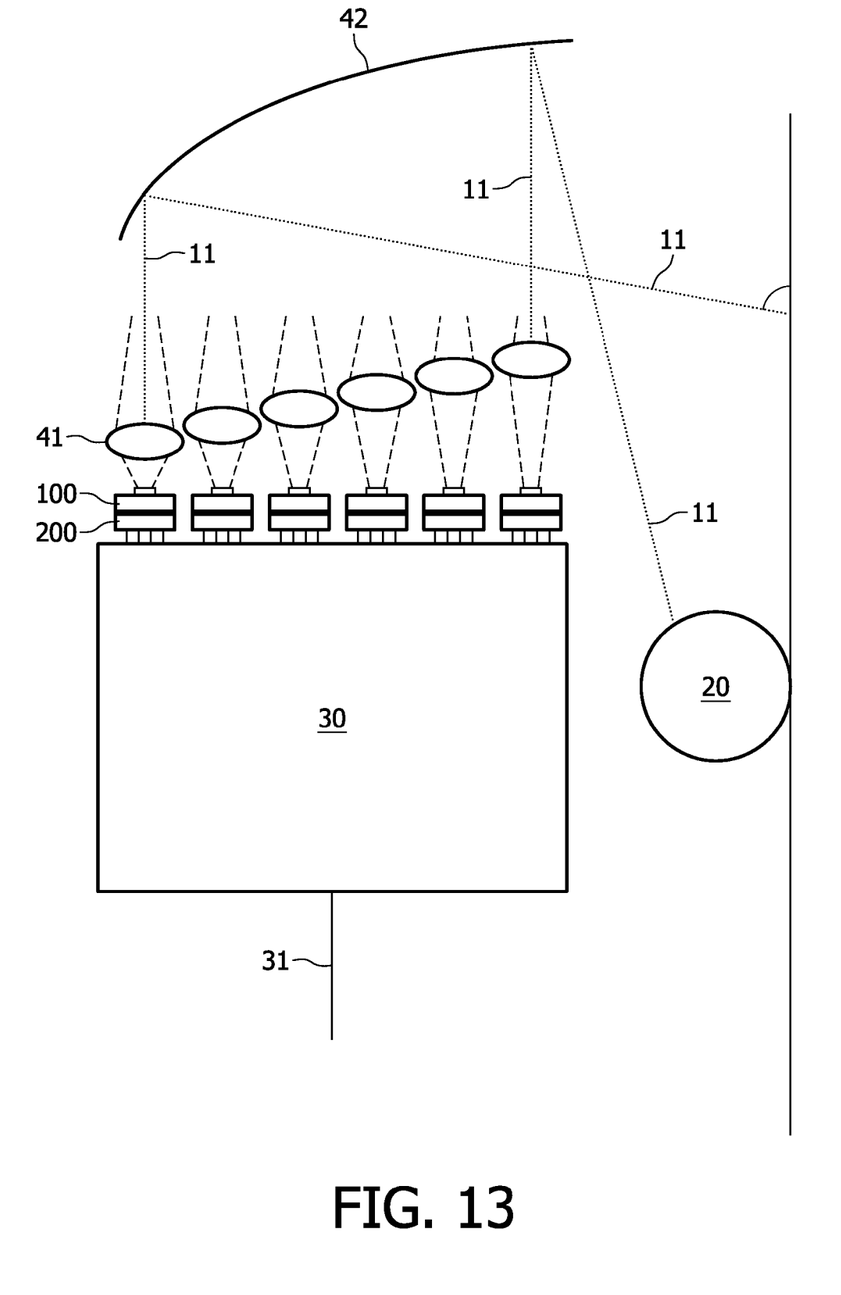
FIG. 13 is a schematic view of an embodiment according to the invention with an array of laser sources.

FIG. 13 is a schematic view of a further embodiment of a sensor system according to the invention. The sensor system is mounted to a vehicle (not shown). In this embodiment, an array of laser sources 100 (VCSELs) is combined. Micro-lenses 41 as well as a curved mirror 42 are added to each laser source. The laser radiation 11 emitted by the laser sources 100 are collimated by the micro-lenses 41 and further focused by the mirror 42 into different directions with respect to the surface the vehicle is driving on, i.e. a road. The curvature of the curved mirror 42 is chosen in such a way that it covers several angles of incidence between the laser beams impinging upon the road and/or the laser beam or beams impinging upon the wheel 20. Furthermore, a two-dimensional array of laser sources 100 may be used in combination with a mirror 42 which is curved in two dimensions so as to increase the number of laser beams having different angles of incidence. The focal length and/or position of the individual micro-lenses 41 are chosen in such a way that they have similar focusing conditions for the different angles of incidence. The different position of the micro-lenses 41 yields a different distance to the foci. A different focal length of the individual micro-lens 41 would also do so. The road and the wheel 20 scatter back a quantity of light, which is focused by means of the curved mirror 42 and the micro-lenses 41 into the laser cavity of the laser sources 100. The amount of feedback determines the laser power, which is monitored on the back of the VCSEL with a detector 200, which are photodiodes integrated with the laser source 100. The individual signals are amplified, and the frequency spectra are analyzed by means of analyzer circuits 30 connected with the photodiodes. Knowing the laser sensor from which the signal is coming and comparing the different results, it is possible to calculate the velocity component of the vehicle and the rotational velocity of the wheel 20. This result is communicated via the interface 31 to e.g. a control circuit (not shown) of a vehicle control system or a driver information system. Some of the laser sources of the array may be used to measure the distance to the road and/or the wheel continuously in order to improve the accuracy of the sensor system by determining the relative position of the body of the vehicle with respect to the road. Alternatively, the whole array may be subsequently switched between velocity and distance measurements by changing the driving schemes by means of the driving circuit or circuits of the laser sources 100 (not shown).

The present invention has been described with reference to particular embodiments and certain drawings, but this is not to be construed in a limiting sense, as the invention is limited only by the appended claims. Any reference signs in the claims shall not be construed as limiting the scope thereof. The drawings described are only schematic and are non-limiting. In the drawings, the size of some of the elements may be exaggerated and not drawn to scale for illustrative purposes. Use of the verb "comprise" and its conjugations in the description and claims does not exclude other elements or steps. Use of the indefinite or definite article when referring to a singular noun, e.g. "a" or "an", "the" includes a plural of this noun unless specifically stated otherwise.

Furthermore, the terms first, second, third and the like in the description and claims are used to distinguish between similar elements and not necessarily to describe a sequential or chronological order. It is to be understood that the terms so used are interchangeable under appropriate circumstances and that the embodiments of the invention described hereinbefore are capable of operation in sequences other than those herein described or illustrated.

Moreover, the terms top, bottom, first, second and the like in the description and claims are used for descriptive purposes and not necessarily for describing relative positions. It is to be understood that the terms so used are interchangeable under appropriate circumstances and that the embodiments of the invention described hereinbefore are capable of operation in orientations other than those herein described or illustrated.

Other variations of the disclosed embodiments can be understood and effected by those skilled in the art in practicing the claimed invention, from a study of the drawings, the disclosure, and the appended claims.

The invention claimed is:

1. A sensor system comprising:
   at least one laser sensor working with self-mixing interference comprising a plurality of Vertical Cavity Surface Emitting Laser sources adapted to emit laser radiation in essentially the same direction and a corresponding plurality of integrated photodiodes adapted to detect back-scattered light from the emitted laser radiation, respectively;
   at least one rotation sensor; and
   an analyzer circuit,
   wherein the at least one laser sensor is adapted to generate first measurement data using self-mixing interference resulting from a first velocity component of a vehicle, the rotation sensor is adapted to generate rotational measurement data resulting from a first rotational velocity of a first wheel of the vehicle, and the analyzer circuit is adapted to receive the first measurement data generated by the at least one laser sensor and rotational measurement data generated the rotation sensor, and is further adapted to determine the first velocity component of the vehicle and the first rotational velocity of the first wheel of the vehicle using the first measurement data and the rotational measurement data.

2. The sensor system according to claim 1, wherein the rotation sensor is a laser sensor working with self-mixing interference.

3. The sensor system according to claim 1, further comprising:
a control element configured to vary at least one of a focal point of the laser radiation, an intensity of the laser radiation and a direction of the laser radiation emitted by the Vertical Cavity Surface Emitting Laser diodes in different ways.

4. The sensor system according to claim 1, wherein the at least one laser sensor is further adapted to generate distance measurement data resulting from a first distance between a mounting location of the laser sensor and a surface on which the vehicle is driving and at least a second distance between the mounting location of the laser sensor and the surface on which the vehicle is driving, or between the mounting location of the laser sensor and the surface of the first wheel of the vehicle, the first distance being different from the second distance and the analyzer circuit being adapted to determine the first distance and the second distance.

5. A vehicle control system comprising:
the sensor system according to claim 1; and
a control circuit adapted to receive data from the analyzer circuit and to activate at least one vehicle system controller taking the data received from the analyzer circuit into account.

6. The vehicle control system according to claim 5, wherein the control circuit is adapted to activate the at least one vehicle system controller so as to initiate test accelerations of at least one first wheel of the vehicle independently of the data received from the analyzer circuit, and wherein the control circuit is further adapted to determine a maximum frictional force between at least the first wheel and a surface on which the vehicle is driving by analyzing the data received from the analyzer circuit.

7. The vehicle control system according to claim 6, wherein the control circuit is further adapted to determine a normal force between the first wheel and the surface on which the vehicle is driving, and to determine a coefficient of driving friction between the first wheel and the surface on which the vehicle is driving.

8. A system comprising:
the sensor system according to claim 1; and
a driver information system adapted to receive data from the sensor system and to supply at least one of optical and acoustical information based on the data received from the sensor system to a driver of the vehicle.

9. The system according to claim 8 further comprising:
the vehicle control system of claim 9, wherein the driver information system is adapted to receive data from the vehicle control system and is further adapted to supply at least one of optical and acoustical information based on the data received from the vehicle control system to a driver of the vehicle.

10. The sensor system according to claim 1, wherein the at least one laser sensor working with self-mixing interference comprises an array of Vertical Cavity Surface Emitting Laser diodes which are adapted to emit laser radiation in essentially the same direction.

11. A sensor system comprising:
at least one laser sensor working with self-mixing interference comprising a plurality of Vertical Cavity Surface Emitting Laser diodes which are adapted to emit laser radiation in essentially the same direction and to generate measurement data resulting from a first velocity component of a vehicle;
at least one rotation sensor adapted to generate measurement data resulting from a first rotational velocity of a first wheel of the vehicle; and
an analyzer circuit adapted to receive the measurement data generated by the at least one laser sensor and the at least one rotation sensor, and to determine the first velocity component of the vehicle and the first rotational velocity of the first wheel of the vehicle using the first measurement data and the rotational measurement data,
wherein the at least one laser sensor is further adapted to generate second measurement data with self-mixing interference resulting from a second velocity component of the vehicle different from the first velocity component, and the analyzer circuit is further adapted to determine the second velocity component of the vehicle using the second measurement data.

12. The sensor system according to claim 11, wherein the at least one laser sensor is further adapted to generate third measurement data with self-mixing interference resulting from a third velocity component of the vehicle different from the first velocity component and the second velocity component, and the analyzer circuit is further adapted to determine the third velocity component of the vehicle using the third measurement data.

13. The sensor system according to claim 12, wherein the analyzer circuit is further adapted to determine traction between at least the first wheel and a surface on which the vehicle is driving by analyzing the first rotational velocity in relation to at least one of the first velocity component, the second velocity component and the third velocity component of the vehicle.

14. A sensor system of a vehicle, the system comprising:
a first laser sensor comprising a first laser source configured to emit laser radiation and a first integrated detector configured to detect backscattered light from a surface on which the vehicle is driving, the laser sensor being configured to generate first measurement data, using self-mixing interference, resulting from as least one velocity component of the vehicle;
a second laser sensor comprising a second laser source configured to emit laser radiation and a second integrated detector configured to detect backscattered light from a surface of a wheel of the vehicle, the second laser sensor being configured to generate second measurement data, using self-mixing interference, resulting from a rotational velocity of the wheel of the vehicle; and
an analyzer circuit configured to receive the first and second measurement data generated by the first and second laser sensors, respectively, and to determine the at least one velocity component of the vehicle and the first rotational velocity of the first wheel of the vehicle.

15. The sensor of claim 14, wherein the laser sensor comprises a Vertical Cavity Surface Emitting Laser (VCSEL).

16. The sensor of claim 14, wherein the laser sensor comprises a Vertical Extended Cavity Surface Emitting Laser (VECSEL).

* * * * *